(12) United States Patent
Marforio et al.

(10) Patent No.: US 6,712,033 B2
(45) Date of Patent: Mar. 30, 2004

(54) SPARK ELECTRODES WITH ADJUSTABLE GAP

(75) Inventors: Karl Marforio, Trollhattan (SE); Alf Hedlund, Trollhattan (SE)

(73) Assignee: Saab Automobile AB (SE)

( * ) Notice: Subject to any disclaimer, the term of this patent is extended or adjusted under 35 U.S.C. 154(b) by 0 days.

(21) Appl. No.: 10/168,246

(22) PCT Filed: Dec. 4, 2000

(86) PCT No.: PCT/SE00/02419

§ 371 (c)(1),
(2), (4) Date: Sep. 19, 2002

(87) PCT Pub. No.: WO01/45216

PCT Pub. Date: Jun. 21, 2001

(65) Prior Publication Data

US 2003/0051699 A1 Mar. 20, 2003

(30) Foreign Application Priority Data

Dec. 15, 1999 (SE) ................................................ 9904596

(51) Int. Cl.⁷ ............................. F02P 15/04; F02P 13/00
(52) U.S. Cl. ................................. 123/169 EA; 123/158; 123/159; 123/161; 123/162
(58) Field of Search ................................. 123/158, 159, 123/161, 162, 169 EA, 169 EC

(56) References Cited

U.S. PATENT DOCUMENTS

| 1,009,084 | A |   | 11/1911 | Meacham |
|---|---|---|---|---|
| 1,254,449 | A | * | 1/1918 | Thomas ................. 123/169 EC |
| 1,452,054 | A | * | 4/1923 | Propst .................. 123/169 EC |
| 1,542,504 | A | * | 6/1925 | Heide ................... 123/169 EC |
| 2,031,293 | A |   | 2/1936 | Wamelink .................... 123/169 |
| 5,915,349 | A | * | 6/1999 | Biemelt et al. ............. 123/162 |

FOREIGN PATENT DOCUMENTS

| CH | 522308 | 2/1970 |
| DE | 3430675 | 3/1986 |
| JP | 9-219275 | 8/1997 |

* cited by examiner

*Primary Examiner*—Erick Solis
(74) *Attorney, Agent, or Firm*—Ostrolenk, Faber, Gerb & Soffen, LLP

(57) ABSTRACT

In an ignition electrode arrangement for a cylinder in an internal combustion engine, for example an Otto engine, a cylinder head (3) bears a first electrode (7) and a second electrode (8) which interact with one another. At least the first electrode (7) is arranged on an ignition means (6) fastened in the cylinder head. According to the invention, the second electrode (8) is movable relative to the cylinder head (3) and the first electrode (7) in order to make it possible to change the spark gap. The second electrode (8) can be mounted on the cylinder head (3) itself or on the ignition device (6). The size of the spark gap is controlled during operation by the ignition system of the engine.

8 Claims, 2 Drawing Sheets

SPARK ELECTRODES WITH ADJUSTABLE GAP

TECHNICAL FIELD

The invention relates to an ignition electrode arrangement for an internal combustion engine, and particularly to adjusting a spark gap by moving one of the electrodes relative to the other.

STATE OF THE ART

In an internal combustion engine of the Otto type, use is normally made of an ignition electrode arrangement in which a positive electrode and an earth electrode are assembled in a sparking plug which is mounted removably in the cylinder head of the engine and has a fixed spark gap.

In order to achieve better combustion conditions in the case of inter alia low load, it is desirable to be able to use a larger spark gap than a conventional sparking plug allows, and the use has therefore been proposed of an ignition electrode arrangement in which the sparking plug has only a positive electrode and the earth electrode is arranged on the piston of the cylinder. By selecting a suitable ignition time, it is in this way possible to obtain the desired electrode distance. However, a disadvantage is that, with a large spark gap, it is not always possible to produce a satisfactory spark because, for practical reasons, the ignition voltage has to be limited and is therefore not always adequate. In this connection, there is a risk that the spark will, instead of striking the piston, strike the cylinder head close to the sparking plug, with various disadvantages as a consequence.

In order to achieve a larger spark gap than with a conventional sparking plug, positioning a fixed earth electrode on the cylinder head has also been tried instead of having an earth electrode on the sparking plug. However, this solution does not allow the size of the spark gap to be changed, which is possible when the earth electrode is positioned on the piston.

THE OBJECT OF THE INVENTION

One object of the invention is to produce an improved ignition electrode arrangement. Another object is to make possible improved spark control and in this way improved combustion control.

SUMMARY OF THE INVENTION

These objects are achieved by means of an ignition electrode arrangement having one electrode movable with respect to the other by movement of the one electrode around an axis, e.g., by pivoting motion. Different orientation axes are possible for the pivoting.

By making the second electrode movable, a possibility is afforded for changing the size of the spark gap. By furthermore controlling the size of the spark gap as a function of the current operating situation, it is possible to produce an optimum ignition spark for the current operating situation, which in turn results in advantages with regard to the possibility of, in combination with other combustion-related parameters, such as, for example, ignition time, type of fuel/air mixture, the turbulence configuration in the cylinder, temperature, degree of supercharging, compression etc., refining the combustion process in order to achieve advantages with regard to the environment, fuel consumption, drivability in different situations etc.

Further advantages and features of the invention emerge from the description and patent claims below.

The invention is explained in greater detail below by means of exemplary embodiments shown in the appended drawing.

DESCRIPTION OF EXEMPLARY EMBODIMENTS

Figure 1:
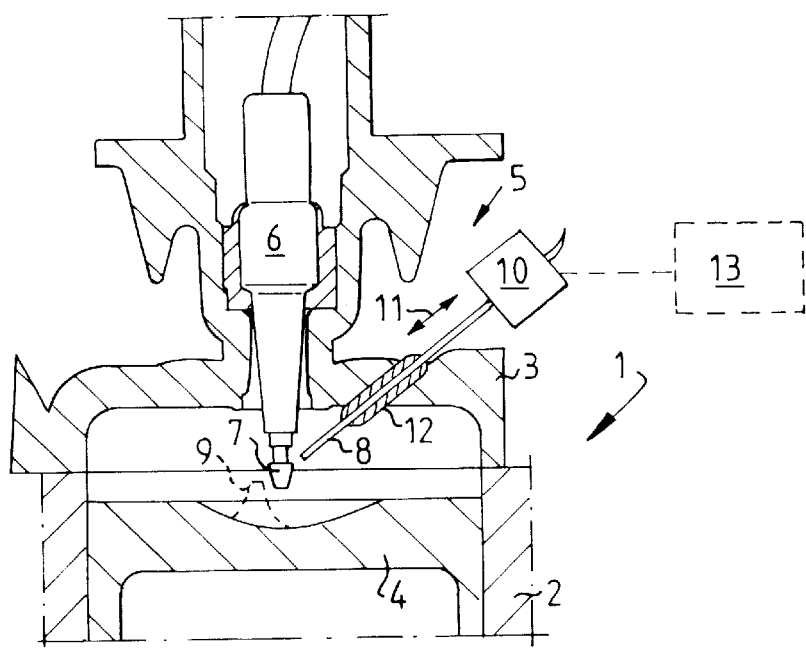
FIG. 1 shows a diagrammatic view of a cylinder in an engine with a first embodiment of an ignition electrode arrangement according to the invention.

FIG. 1 shows diagrammatically a cylinder 1 in an internal combustion engine, otherwise not shown in greater detail, with spark ignition, in this case of the Otto type. A piston 4 reciprocates in a cylinder block 2 which is covered at the top by a cylinder head 3. The cylinder 1 is provided with an ignition electrode arrangement 5 for igniting a fuel mixture introduced into the cylinder. Customary inlet and outlet valves in the cylinder, as well as other conventional components, have been omitted for the sake of simplicity and clarity, but do of course form part of the engine described.

The ignition electrode arrangement 5 includes a single-pole ignition means 6 which is fastened removably in the cylinder head 3 and forms a first electrode 7, and a second electrode 8 mounted on the cylinder head 3. If appropriate, an extra second electrode 9, which is arranged on the piston 4 and can be designed as, for example, a raised portion laterally offset relative to the ignition means 6, can also be present in addition to the second electrode 8.

The second electrode 8 can, by means of an operating device 10, be displaced to and fro in the direction of the double arrow 11 and, for this purpose, runs in a sealed manner in a guide 12 in the cylinder head 3. By virtue of the fact that the second electrode 8 is therefore movable relative to the cylinder head 3 and the ignition means 6 with the first electrode 7, it is possible to vary the size of the spark gap by means of the operating device 10 which, for the purpose, can suitably be controlled by a control unit 13 forming part of the ignition system of the vehicle in order in this way to vary the size of the spark gap as a function of suitable operating parameters, according to requirements. It is also possible to make the control unit 13 control the ignition voltage also as a function of suitable operating parameters, according to requirements, and in this manner to achieve further improved ignition control.

The single-pole ignition means 6 can consist of only a first electrode 7 which forms an insulated positive electrode, but it can, if appropriate, also consist of a combination of a positive electrode and a suitable fuel-injection means, which are assembled in such a manner that effective fuel injection can take place without the ignition function being jeopardized, and vice versa. In this connection, the second electrode 8 forms an earth electrode.

Figure 2:
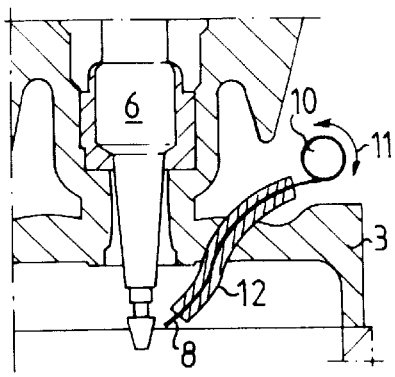
FIGS. 2–4 show variants of the embodiment in FIG. 1.

In the embodiment shown in FIG. 2, the second electrode 8 runs in a curved guide 12 which results in a different movement pattern for the second electrode 8 to that in the straight guide in FIG. 1. Furthermore, the operating device 10 in FIG. 2 is designed for rotary movement to and fro in order to provide an electrode movement according to the double arrow 11, the second electrode 8 being mounted, if appropriate, on a roller in the operating device 10.

Figure 3:
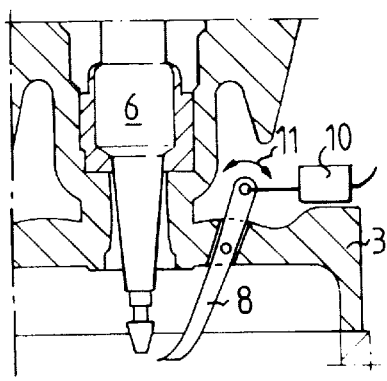

In the embodiment shown in FIG. 3, the second electrode 8 is mounted pivotably in the cylinder head 3, suitably in a plane essentially parallel to the longitudinal direction of the cylinder, in order in this way to make it possible to change the size of the spark gap to the ignition means 6. The pivoting movement is controlled by means of the operating device 10 so as to impart a movement according to the double arrow 11. The necessary sealing between the second electrode 8 and the cylinder head 3 has been omitted here for the sake of clarity.

Figure 4:
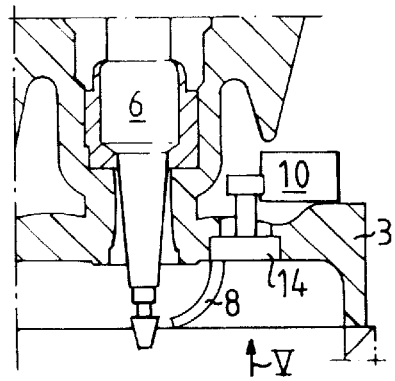
Figure 5:
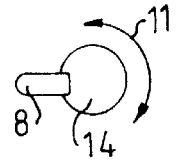
FIG. 5 shows a view in the direction of the arrow V of a component in FIG. 4.

FIGS. 4 and 5 show how the second electrode 8 is mounted rotatably in the cylinder head 3 about an axis which is essentially parallel to the longitudinal direction of the cylinder. In this connection, the second electrode 8 itself is mounted on a holder 14 which is mounted rotatably in the cylinder head 3 and is acted on by an operating device 10 so as to impart a rotary movement according to the double arrow 11.

The desired movement of the second electrode 8 is adapted via the control unit 13 and the operating device 10 in such a manner that a spark gap adapted to the current operating situation is achieved. In this connection, it may be desirable for the spark gap to be changed only intermittently, when predetermined changes in the operating situation take place, but virtually continuous changing of the spark gap may be desirable in certain situations, depending on the prevailing operating conditions and the desired operating conditions.

Figure 6:
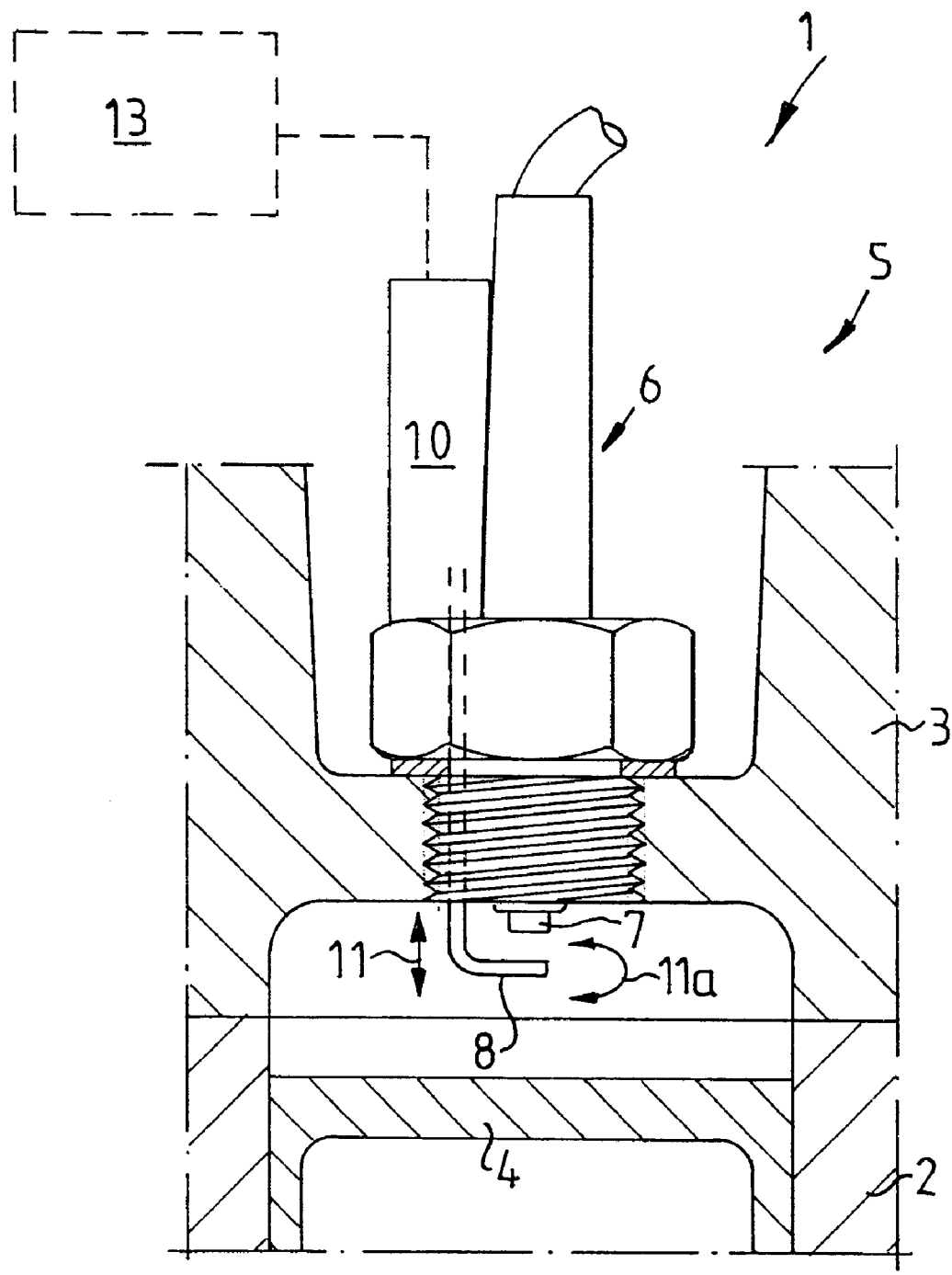
FIG. 6 shows a diagrammatic view corresponding to FIG. 1 of a second embodiment of an iqnition electrode arrangement according to the invention.

FIG. 6 shows an alternative embodiment to the embodiment in FIG. 1, in which the second electrode 8, instead of being separate from the ignition device 6 and the first electrode 7, is arranged on the ignition means 6. In this case, the second electrode 8 is mounted movably in the ignition device 6 and is movable by means of an operating device 10 which is here mounted on the ignition device 6 but can instead, if appropriate, be mounted on the cylinder head 3 itself. As in FIG. 1, the operating device 10 is suitably controlled by a control unit 13 forming part of the ignition system of the vehicle. The second electrode 8 is in this case mounted displaceably essentially in the longitudinal direction of the cylinder, in the direction of a double arrow 11. It is also possible instead to make the second electrode 8 movable in a plane essentially at right angles to the longitudinal direction of the cylinder, according to the double arrow 11a. If appropriate, the second electrode 8 can, in a further variant, be movable in both the longitudinal direction of the cylinder and a plane essentially at right angles to this longitudinal direction. The form and the positioning selected for the second electrode can be different from those shown here, according to requirements.

In addition to the exemplary embodiments shown above, a number of other embodiments are of course possible within the scope of the invention, according to the requirements and prerequisites concerned.

As shown, the invention can be applied to spark-ignited engines of the Otto type, but there is of course nothing to prevent the invention being applied instead to, for example, a two-stroke engine or another type of spark-ignited engine. The proposed solution allows advantageous, simple exchangeability of electrodes.

The adjustability of the size of the spark gap proposed according to the invention makes it possible in a suitable manner to change the spark gap as a function of the current operating situation, if appropriate in combination with control of the ignition voltage. In this way, a possibility is afforded for influencing the combustion in the cylinder advantageously so that improvements are achieved with regard to, for example, fuel consumption, drivability and environmental aspects.

What is claimed is:

1. An ignition electrode arrangement for a cylinder of an internal combustion engine, wherein the cylinder includes a cylinder head and a piston in the cylinder movable toward and away from this cylinder head;

the electrode arrangement comprising:
a first electrode supported in the cylinder;
a second electrode supported in the cylinder, the second electrode having a tip;
the first and second electrodes interacting for causing a spark for ignition of fuel in the cylinder;
an ignition element fastened to the cylinder head;
the first electrode is arranged on the ignition element;
the second electrode being separate from the ignition element in the cylinder supported to be and being movable relative to the cylinder head and relative to the first electrode for enabling variation in a spark gap between the first and second electrodes, wherein the second electrode is movable relative to the cylinder head around an axis located a distance from the tip of the second electrode.

2. The ignition electrode arrangement of claim 1, wherein the first electrode is generally centrally arranged on the ignition element.

3. The ignition electrode arrangement of claim 1, wherein the second electrode is movable about an axis that is essentially parallel to the longitudinal direction of the cylinder and the second electrode is movable by being rotatable around the axis for changing the size of the spark gap.

4. The ignition electrode arrangement of claim 3, wherein the second electrode is arranged on the ignition element.

5. The ignition electrode arrangement of claim 1, further comprising an operating device connected with the second electrode for moving the second electrode relative to the cylinder head.

6. The ignition electrode arrangement of claim 1, wherein the ignition element comprises the first electrode and a fuel injection means communicating into the cylinder.

7. An ignition electrode arrangement for a cylinder of an internal combustion engine, wherein the cylinder includes a cylinder head and a piston in the cylinder movable toward and away from this cylinder head;

the electrode arrangement comprising:
a first electrode supported in the cylinder;
a second electrode supported in the cylinder, the second electrode having a tip;
the first and second electrodes interacting for causing a spark for ignition of fuel in the cylinder;
an ignition element fastened to the cylinder head;
the first is electrode arranged on the ignition element;
the second electrode being supported to be and being movable relative to the cylinder head and relative to the first electrode for enabling variation in a spark gap between the first and second electrodes, wherein the second electrode is movable relative to the cylinder head around an axis located a distance from the tip of the second electrode;
the second electrode is movable about an axis that is essentially perpendicular to a longitudinal direction of the cylinder and the second electrode, the second electrode being movable by being pivotable around the axis and in a plane essentially parallel to the longitudinal direction of the cylinder.

8. An ignition electrode arrangement for a cylinder of an internal combustion engine, wherein the cylinder includes a cylinder head and a piston in the cylinder movable toward and away from this cylinder head;

the electrode arrangement comprising:
- a first electrode supported in the cylinder;
- a second electrode supported in the cylinder, the second electrode having a tip;
- the first electrode is a positive electrode and the second electrode is a negative electrode;
- the first and second electrodes interacting for causing a spark for ignition of fuel in the cylinder;
- an ignition element fastened to the cylinder head;
- the first is electrode arranged on the ignition element;
- the second electrode being supported to be and being movable relative to the cylinder head and relative to the first electrode for enabling variation in a spark gap between the first and second electrodes, wherein the second electrode is movable relative to the cylinder head around an axis located a distance from the tip of the second electrode.

* * * * *